Patented Dec. 5, 1950

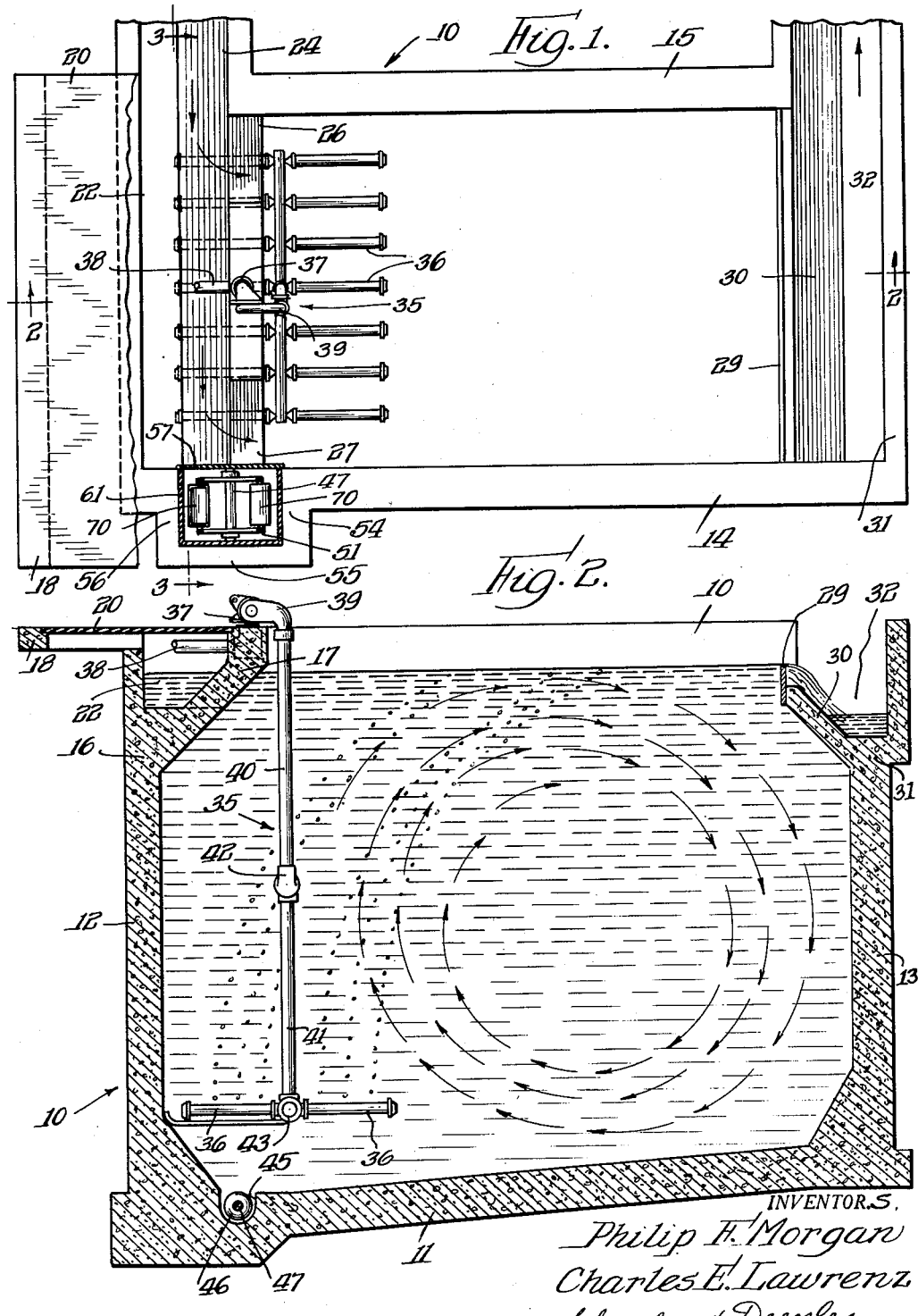

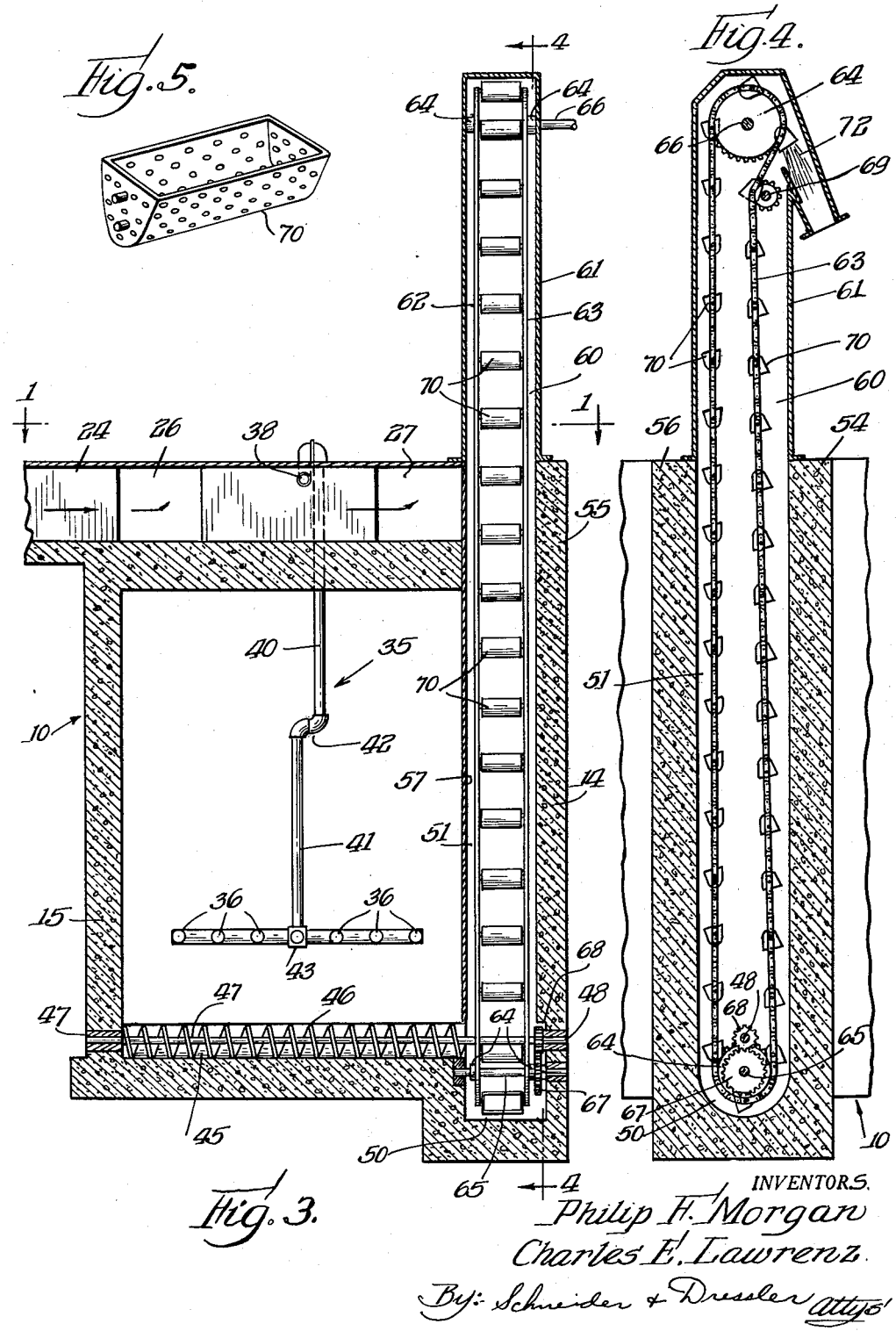

2,532,457

UNITED STATES PATENT OFFICE 2,532,457

METHOD AND APPARATUS FOR REMOVING GRIT

Philip F. Morgan, Elmhurst, and Charles E. Lawrenz, Chicago, Ill., assignors to Chicago Pump Company, a corporation of Delaware Application March 1, 1945, Serial No. 580,460

11 Claims. (Cl. 210—3)

1

This invention relates to a method and apparatus for separating from a flowing liquid stream grit and other sedimentary, abrasive matter which does not readily lend itself to the general methods of classification or sedimentation. It particularly relates to the removal of such heavy solid matter from a flowing sewage stream to prevent the abrasive action of this heavy matter on the mechanical devices used in a sewage treating system, and to aid in maintaining the efficiency of operation of the sewage treating system at a high level.

The heavy, non-flowable solids in a sewage stream, such as grit, sand and gravel, have been removed heretofore by means of grit chambers which have been interposed in the sewage treating system after the screening and comminuting devices and in advance of the settling and digestion tanks. The object in view in thus positioning these prior art grit chambers was to eliminate as much of these heavy solids as possible before the sewage entered the settling and digesting tanks because the presence of these heavy materials in these tanks interfered with the removal of the sludge therefrom and because these heavy solids tended to deposit themselves in the form of a sealing layer around the digestion tank which prevented the transfer of heat to the heating coils, thereby interfering with the normal operation of the digester. However, in such systems, the screening and comminuting devices were subjected to the abrasive action of these heavy solids, resulting in costly replacements and in interruption of the operation of the system.

In general, these prior art grit chambers are in the form of an enlarged channel or elongated basin, the cross section of which increases away from the inlet side to reduce the velocity of the flowing sewage stream and thereby allow the heavy solids to deposit along the bottom of the channel or basin. In such systems attempts were made to control the velocity of the sewage stream to accomplish the aforesaid deposition of heavy solids and at the same time to maintain the flow at a suitable velocity so that the lighter organic materials were maintained in suspension. Since great difficulty was encountered in thus controlling the flow of sewage through the grit chamber to effect the selective settling of the heavy solids, these grit chambers and this method of heavy solids sedimentation have not proved to be very satisfactory.

There are a number of methods of removing heavy solids from a grit chamber in use today

2 and these are generally classed as (1) hand cleaning methods, (2) mechanical cleaning methods and (3) hydraulic or hydro-separation cleaning methods. These methods, except for the latter, are generally used in systems where the velocity of flow of sewage is reduced by increasing the cross section of the grit chamber or channel.

The hand cleaning method is commonly employed in small plants. As a preliminary to the cleaning, the chamber must be dewatered and this is usually accomplished by draining the chamber to a wet well or by pumping the liquid therefrom. The grit is then manually shoveled from the chamber into containers of varying size. The main objections to this method are that the removal of the grit is laborious, obnoxious and unsanitary, and it is necessary to have an extra grit chamber to take the place of the one being cleaned, in order to keep the system functioning continuously.

The mechanical cleaning methods are used in larger plants and are dependent for their operation upon the use of a rather costly and cumbersome heavy solids collector mechanism which is positioned within the grit chamber. This collecting mechanism collects the heavy solids and pushes them to one end of the chamber from which they are removed by mechanical means such as a screw conveyor or a bucket elevator. Since in the operation of these methods it is essential to have the heavy solids collector mechanism positioned substantially centrally of the grit chamber, the flow of sewage through the chamber is difficult to control because the collecting mechanism is in the line of this flow and interferes therewith. Other objections to these methods are that they require cumbersome and costly mechanical installations and can only be carried out in the system after the sewage passes through the screening and comminuting mechanisms, since the presence of rags, large pieces of wood and similar materials interfere with the operations of the solids collecting mechanism and the solids discharge mechanism.

In the hydro-separation process the raw sewage flows through a shallow tank and is retained there for a short time to allow the heavy solids and the lighter organic matter to settle to the bottom of the tank. A rotating collecting mechanism at the bottom of the tank collects and pushes the deposit of solid material to one side of the tank from which it is moved up a sloping incline to the point of discharge. As these solid materials are moved up the incline they are washed, in counter flow, by water to wash out the lighter organic matter and return it to the tank. This method has not proved to be very satisfactory because of the rather incomplete removal of the grit and other heavy solids and because of the need to have the grit removing apparatus positioned in the system after the screening and comminuting devices.

Apart from the foregoing, attempts have been made to remove heavy solids which have been deposited in the bottom of aeration tanks by means of air lifts. While in such systems diffused air has been used to control the deposition of the heavy solids, the removal of the deposited solids has not been successful because of clogging difficulties and because of the large amount of water and suspended organic matter which was required to be removed along with the heavy solids. Attempts have been made to remove the grit deposited in aeration tanks by hand shoveling and by means of pumps. The former is objectionable because of the large amount of labor involved and the need to discontinue the operation of the system while the heavy solids are removed, and the latter has not been successful because of the clogging problem.

The method of removing heavy solids from a grit chamber in accordance with our invention is very simple and effective and has none of the disadvantages inherent in the prior art methods. Our method, in brief, comprises effecting a controlled deposition of the heavy solids and the concentration thereof at the bottom and along one side of the tank by means of diffused air and a circulatory movement of the liquid in the tank which is brought about by the controlled introduction of the air into the tank, and the continuous mechanical removal of the concentrated heavy solids from the tank without interfering with the flow of liquid therein and while the system is in operation.

In accordance with our invention, the total raw sewage from the influent channel is passed directly to an aeration tank which is positioned in advance of the conventional screening and comminuting devices. The raw sewage in the tank is circulated therein by means of the rotary motion induced by the introduction of air from a position a short distance above the bottom of the tank and adjacent to a side wall thereof. In the downward movement of the raw sewage through the tank the grit and other heavy solids are deposited along the bottom and are carried by the moving liquid to one side of the tank, beneath the position where the air is introduced into the tank. The deposition of the heavy solids from the raw sewage is continuous as is also the flow of aerated sewage freed from heavy solids over the effluent weir and out through the effluent channel. The velocity of circulation of the sewage in the tank is controlled by the rate of introduction of air into the tank and is practically independent of the rate of flow of the sewage into the tank. This velocity of rotation is so maintained that it will be sufficient to selectively deposit the heavy solids and push them along the bottom of the tank to a substantially quiescent zone at one side of the tank, but will not be great enough to pick up and recirculate the concentrated solids.

We provide a screw conveyor at the place where the deposited heavy solids are concentrated which carries these heavy solids to a small pit or sump located adjacent one end of the screw, from which sump a continuously operated bucket elevator carries the heavy solids out of the tank for disposition as desired.

During the deposition of the heavy solids from the sewage liquor in accordance with our invention, there is comparatively little deposition of the lighter organic material because the velocity of rotation of the liquid is so maintained that this lighter material is kept in substantially constant circulation and passes with the sewage liquor over the effluent weir for further treatment in the system.

Our invention has many other advantages which will be set forth or be made apparent in connection with the following detailed description of a preferred form of apparatus for use in treating sewage in accordance with our invention, illustrated in the accompanying drawings, in which:

Figure 1 is a sectional plan view, taken substantially along the line 1—1 of Fig. 3, of a grit chamber in accordance with our invention in which the method of our invention may be carried out;

Fig. 2 is a transverse section of the grit chamber taken substantially along the line 2—2 of Fig. 1;

Fig. 3 is a vertical transverse section of the apparatus taken substantially along the line 3—3 of Fig. 1;

Fig. 4 is a similar view taken substantially along the line 4—4 of Fig. 3; and

Fig. 5 is a perspective view of a perforated bucket used in accordance with the invention.

Referring to the drawings, there is shown a tank 10, of concrete or other suitable material, having a bottom 11, end walls 12 and 13 and side walls 14 and 15. The bottom 11 of the tank may be flat but it is preferred that it have a gentle slope downwardly from one end wall towards the other. In the tank shown in the drawings, bottom 11 slopes downwardly from end wall 13 towards end wall 12.

End wall 12, near the top thereof, takes the form of a half Y 16 having a diverging branch 17 which extends interiorly of the tank. Extending outwardly from the top of wall 12 is a platform 18 which, together with a cover plate 20 for the channel 22 formed by the half Y 16, forms a cat-walk along the end of the wall. Channel 22 extends along the length of end wall 12 and communicates with the influent channel 24 through which liquid containing grit, for example raw sewage, flows. Openings 26 and 27 are provided in branch 17, on opposite sides thereof, and these form the inlet ports to the tank for the sewage introduced into channel 22 from channel 24.

The liquid in the tank is maintained at a substantially constant level near the top of the tank as by the overflow weir 29 at the top of branch 30 of a diverging half Y 31 at the top of end wall 13. This half Y forms an outlet channel 32 for the substantially grit-free liquid flowing over the weir.

An air diffusing device, indicated generally by the numeral 35, is placed within the tank with the air diffusion units 36 thereof positioned adjacent to end wall 12 and vertically thereof, a short distance above the bottom 11 of the tank. The air diffusing device may be of a stationary character, but we prefer that it be of the "swing" type such as is described and claimed in the patent to Nordell, No. 2,144,385, granted January 17, 1939, and in the patent to Lannert, No. 2,328,655, granted Setember 7, 1943. The form of air diffusion unit illustrated in the drawing is of the "swing" type described and claimed in the Lannert patent.

Air diffusion device 35 has a hollow housing 37 which is anchored in the top of the diverging branch 17 of end wall 12 and which is in communication with the source of air under pressure flowing through supply pipe 38. Pivotally mounted on housing 37 is a fitting 39 in the form of an elbow through which air from the housing passes to a pipe 40 which is threaded into fitting 39. A second pipe 41 is hingedly jointed to pipe 40, as at 42, and the lower end of pipe 41 is threaded into an air header 43 which feeds air to the individual air diffusion units 36.

In order to "swing" the air diffusion device out of the tank, a hoist or other lifting mechanism is attached to the underside of fitting 39, at the elbow portion, and on upward pull on the hoist mechanism pipe 40 is moved in a vertical plane, generally normal to the end wall 12, carrying with it pipe 41 and the associated header and air diffusion units. In the upward movement of pipe 40, pipe 41 maintains substantially the vertical position shown and these two pipes become folded in somewhat of a jack-knife manner when the air diffusion device is completely swung out of the tank above the cat-walk. The advantages of using a "swing" diffusion device are that the diffusion elements may be readily replaced if broken, and rags or any other stringy materials which have wrapped themselves about the diffusing elements may be removed readily merely by swinging the air diffusion unit out of the tank.

As the air passes from the air diffusing elements upwardly to the surface of the liquid in the tank, it induces a circulatory motion of the liquid within the tank in a direction away from and then back to the air diffusing elements. Grit and other heavy solids in the liquid continuously settle from the body of the liquid along the bottom of the tank and are pushed or "swept" by the liquid into a trough 45. This trough is at the end of the tank bottom 11, beneath the air diffusion device 35, and extends along the tank bottom 11 parallel to end wall 12. A screw conveyor 46, positioned in this trough, is provided with shafts 47 and 48 which are mounted for rotation in bearings in the side walls 14 and 15. Upon rotation of the screw conveyor as hereinafter described, the grit and other solids material which have been pushed into the trough are carried along the trough towards one end thereof and then dumped into a pit or sump 50.

Sump 50 is at the bottom of a recess 51 formed in the side wall 14 of the tank (Fig. 1). The bottom of the sump is at a lower lever than the bottom of trough 45, as is clearly seen from Fig. 3. Recess 51 extends upwardly from the bottom of sump 50 to the top of the tank and the walls 54, 55 and 56 (which are actually part of the side wall 14) define three sides of an enclosure surrounding the recess. The remaining side of the enclosure is formed by a baffle 57 which extends across the mouth of the recess and throughout the length thereof from a position adjacent the top of one end of the screw conveyor 46. This baffle prevents the liquid within the tank from circulating through the enclosure.

A conventional bucket elevator, of the continuous type, designated generally by the numeral 60, is positioned in recess 51 and extends from a position slightly above the bottom of sump 50 to a position considerably above the top of the tank. The portion of the elevator above the tank is housed within a housing structure 61 which is supported on the tank walls 54, 55 and 56.

The bucket elevator is of the conventional, perfect discharge type and comprises a pair of endless chains 62 and 63 which pass around spaced apart sprocket wheels 64 which are mounted on rotatable shafts 65 and 66, at the bottom and top, respectively, of the enclosure surrounding the bucket elevator. The sprockets at the upper reach of the elevator are larger than the lower ones, and snub sprockets 69 are provided adjacent these larger sprockets so that chains 62 and 63 will be made to pass between the large sprockets and the snub sprockets and be pinched to insure the positive discharge of material from the buckets into discharge outlet 72. Shaft 65 is the driven shaft and it is mounted for rotation in suitable bearings in the walls of the tank as clearly shown in Fig. 3. Shaft 66 is the drive shaft, which may be driven from any suitable source of power, and it is mounted for rotation in opposing walls of housing structure 61. Mounted on shaft 65 is a gear 67 which meshes with a pinion 68 on shaft 48. It is manifest from the construction shown that upon rotation of shaft 66 sprocket wheels 64 are rotated and these, in turn, rotate continuous chains 62 and 63, thereby rotating shaft 65 and, in turn, because of the intermeshed gearing 67 and 68, the screw conveyor 46.

Carried between the endless chains 62 and 63 are a series of buckets 70 which move with the chains throughout the length of the bucket elevator housing. Since the screw conveyor and bucket elevator function simultaneously, grit or other solids material pushed into trough 45 are carried by the screw conveyor along the trough and dumped into sump 50 and from there they are picked up by the buckets and carried to the top of the bucket elevator housing and discharged through opening 72.

In the operation of the hereinabove described grit chamber, the raw sewage enters channel 22 from the influent channel 24, flows through inlet ports 26 and 27, and empties into the tank. Air under pressure from any suitable source of supply is passed through supply pipe 38 into the aeration equipment 35. The air emerges from the air diffusing elements 36 into the liquid in the tank in the form of very fine bubbles which ascend in the body of the liquid to the surface thereof. Since the air is introduced into the body of the liquid at one end thereof, the result of the upward movement of these bubbles is to effect a circulatory movement of the liquid in the tank away from and back to the air diffusing elements. The rate of introduction of air into the tank is controlled so that the velocity of circulation of the sewage in the tank is such as to permit the settling out and deposition of grid and other solids from the body of the liquid and at the same time insure that the lighter organic matter will be kept in circulation in the liquid.

The grit and other solids deposited on the bottom of the tank are pushed or washed along the bottom of the tank and into trough 45 by the movement of the circulating liquid. The circulating liquid containing the lighter organic matter in suspension continuously flows over effluent weir 29 and into effluent channel 32, from which it flows to other parts of the sewage treating system for further treatment.

During the operation of the grit chamber to remove accumulated deposited solids the bucket elevator is continuously revolved. Due to the intermeshing gears 67 and 68 the screw conveyor 46 in the trough 45 also revolves continuously. The grit and other heavy solids deposited in the trough are carried by the screw conveyor 46 and pushed thereby into sump 50. As the buckets 70 on the bucket elevators come around into the sump they pick up the solids therefrom and carry them to the top of the bucket elevator where they are discharged through outlet 72.

In the operation of the grit chamber in accordance with our invention, the overall operation of the sewage treating plant is improved by the aeration of the sewage which aids in the flocculation of solids, adds dissolved oxygen to the sewage, and aids in separating grease from the other solids in the primary tank to which the sewage flowing over effluent weir 29 may be introduced for treatment.

While the description of our invention has been made in connection with the treatment of raw sewage, it is, of course, obvious that our invention is not restricted to such use for the invention is applicable to the removal of grit from any liquid containing the same. Also, our invention is not to be construed as limited to the details of the illustrative embodiment of the apparatus described, except as defined in the appended claims. Thus, for example, buckets 70 may be perforated to permit liquid therein to drain back to the sump.

We claim:

1. An apparatus for removing grit and other heavy solids from a liquid containing the same in suspension comprising a tank having a bottom and side walls, an inlet adjacent the top of one of said side walls through which the grit-containing liquid is entered into the tank, an overflow weir for maintaining the liquid within the tank at a desired level and an outlet for the liquid in communication therewith, said overflow weir and said outlet being remote from said inlet, means to introduce air into the body of the liquid from a region above the bottom of the tank and adjacent the said inlet wall thereof to circulate the liquid in a generally vertical plane in the direction of said overflow weir, a trough in the tank bottom beneath the said air introducing means into which heavy solids which precipitate from the body of the liquid are carried by the circulating liquid, conveying means in said trough to move the solids to one end of the trough, a sump at the said one end of the trough into which the solids from the trough are delivered and means to remove the solids from the sump.

2. An apparatus for removing grit and other heavy solids from a liquid containing the same in suspension comprising a tank having a bottom and side walls, an inlet adjacent the top of one of said side walls through which the grit-containing liquid is entered into the tank, an overflow weir for maintaining the liquid within the tank at a desired level and an outlet for the liquid in communication therewith, said overflow weir and said outlet being remote from said inlet, means to introduce air into the body of liquid from a region above the bottom of the tank and adjacent the said inlet wall thereof to circulate the liquid in a generally vertical plane in the direction of said overflow weir, a trough in the tank bottom beneath the said air introducing means into which heavy solids which precipitate from the body of the liquid are carried by the circulating liquid, conveying means in said trough to move the solids to one end of the trough, a sump at the said one end of the trough into which the solids from the trough are delivered and conveying means to move the solids from the sump to the exterior of the tank.

3. An apparatus for removing grit and other heavy solids from a liquid containing the same in suspension comprising a tank having a bottom and side walls, an inlet adjacent the top of one of said side walls through which the grit-containing liquid is entered into the tank, an overflow weir for maintaining the liquid within the tank at a desired level and an outlet for the liquid in communication therewith, said overflow weir and said outlet being remote from said inlet, means to introduce air upwardly into the body of the liquid, said means being positioned adjacent the said inlet wall of the tank and a short distance above the tank bottom to circulate the liquid in a generally vertical plane in the direction of said overflow weir, a trough in the tank bottom below the said air introducing means into which heavy solids which precipitate from the body of the liquid are carried by the circulating liquid, a conveying means in said trough to move the solids to one end of the trough, a sump at the said one end of the trough into which the solids from the trough are delivered and conveying means for removing the solids from the sump to the exterior of the tank.

4. An apparatus for removing grit and other heavy solids from a liquid containing the same in suspension comprising a tank having a bottom and side walls, an inlet adjacent the top of one of said side walls through which the grit-containing liquid is entered into the tank, an overflow weir for maintaining the liquid within the tank at a desired level and an outlet for the liquid in communication therewith, said overflow weir and said outlet being remote from said inlet, means to introduce air upwardly into the body of the liquid, said means being positioned adjacent and along the said inlet wall of the tank substantially throughout the width thereof and a short distance above the tank bottom to circulate the liquid in a generally vertical plane in the direction of said overflow weir, a trough in the tank bottom below the said air introducing means into which heavy solids which precipitate from the body of the liquid are carired by the circulating liquid, conveying means in said trough to move the solids to one end of the trough, a sump at the said one end of the trough into which the solids from the trough are delivered and conveying means for removing the solids from the sump to the exterior of the tank.

5. An apparatus for removing grit and other heavy solids from a liquid containing the same in suspension comprising a tank having a bottom and side walls, an inlet adjacent the top of one of said side walls through which the grit-containing liquid is entered into the tank, an overflow weir for maintaining the liquid within the tank at a desired level and an outlet for the liquid in communication therewith, said overflow weir and said outlet being remote from said inlet, means to introduce air upwardly into the body of the liquid, said means being positioned substantially below the liquid level and adjacent and along the said inlet wall of the tank to circulate the liquid in a generally vertical plane in the direction of said overflow weir, a trough in the tank bottom below the said air introducing means into which heavy solids which precipitate from the body of the liquid are carried by the circulating liquid, a conveying means in said trough to move the solids to one end of the trough, a sump at the said one end of the trough into which the solids from the trough are delivered and a bucket elevator to carry the solids from the sump to the exterior of the tank.

6. An apparatus for removing grit and other heavy solids from a liquid containing the same in suspension comprising a tank having a bottom and side walls, an inlet adjacent the top of one of said side walls through which the grit-containing liquid is entered into the tank, an overflow weir for maintaining the liquid within the tank at a desired level and an outlet for the liquid in communication therewith, said overflow weir and said outlet being remote from said inlet, means to introduce air upwardly into the body of the liquid, said means being positioned substantially below the liquid level and adjacent and along the said inlet wall of the tank to circulate the liquid in a generally vertical plane in the direction of said overflow weir, a trough in the tank bottom below the said air introducing means into which heavy solids which precipitate from the body of the liquid are carried by the circulating liquid, a conveying means in said trough to move the solids to one end of the trough, a sump at the said one end of the trough into which the solids from the trough are delivered and a bucket elevator to carry the solids from the sump to the exterior of the tank, said bucket elevator being vertically disposed above said sump and enclosing means for said bucket elevator to prevent the liquid in the tank from circulating therethrough.

7. An apparatus for removing grit and other heavy solids from a liquid containing the same in suspension comprising a tank having a bottom and side walls, an inlet adjacent the top of one of said side walls through which the grit-containing liquid is entered into the tank, an overflow weir for maintaining the liquid within the tank at a desired level and an outlet for the liquid in communication therewith, said overflow weir and said outlet being remote from said inlet, means to introduce air at a predetermined pressure and in a diffused state upwardly into the body of the liquid, said means being positioned substantially below the liquid level and adjacent and along the said inlet wall of the tank to circulate the liquid in a generally vertical plane in the direction of said overflow weir, a trough in the tank bottom below the said air introducing means into which heavy solids which precipitate from the body of the liquid are carried by the circulating liquid, said tank bottom sloping downwardly towards said trough, a conveying means in said trough to move the solids to one end of the trough, a sump at the said one end of the trough into which the solids from the trough are delivered and a bucket elevator to carry the solids from the sump to the exterior of the tank.

8. A method for removing grit and other solids from a raw sewage stream containing the same comprising flowing the stream into a tank having a bottom and side walls and maintaining the sewage in the tank at a desired level by passing sewage from the tank over an overflow weir remote from the inlet to the tank, introducing air at a predetermined pressure upwardly into the body of the sewage within the tank only from a region below the tank inlet, which region is adjacent and along a side wall of the tank and above the bottom thereof, in an amount sufficient to induce in the body of sewage in the tank a circulatory motion in the direction of said overflow weir, to precipitate solids and move the precipitated solids along the tank bottom to a quiescent zone below the region where the air is introduced into the body of the sewage, conveying the solids from said quiescent zone to a sump and then conveying them from said sump to the exterior of the tank, and passing clarified sewage from the tank over the overflow weir.

9. A method for removing grit and other solids from a raw sewage stream containing the same comprising flowing the stream into a tank having a bottom and side walls and maintaining the sewage in the tank at a desired level by passing sewage from the tank over an overflow weir remote from the inlet to the tank, introducing air at a predetermined pressure upwardly into the body of the sewage within the tank only from a region below the tank inlet, which region is adjacent and along a side wall of the tank and above the bottom thereof, in an amount sufficient to induce in the body of sewage in the tank a circulatory motion in the direction of said overflow weir, to precipitate solids and move the precipitated solids along the tank bottom to a quiescent zone below the region where the air is introduced into the body of the sewage, removing the solids from said quiescent zone to the exterior of the tank, and passing clarified sewage from the tank over the overflow weir.

10. An apparatus for removing grit and other heavy solids from a liquid containing the same in suspension, said apparatus comprising a tank having a bottom and side walls, an inlet adjacent the top of one of said side walls through which the grit-containing liquid is entered into the tank, an overflow weir for maintaining the liquid within the tank at a desired level and an outlet for the liquid in communication therewith, said overflow weir and said outlet being remote from said inlet, means to introduce air upwardly into the body of the liquid from a region above the bottom of the tank and adjacent the said inlet wall thereof and thereby to circulate the liquid in the direction of said overflow weir, a trough in the tank bottom beneath the said air introducing means into which heavy solids which precipitate from the body of the liquid are carried by the circulating liquid, and means to remove the solids from the trough to the exterior of the tank.

11. An apparatus for removing grit and other heavy solids from a liquid containing the same in suspension, said apparatus comprising a tank having a bottom and side walls, an inlet adjacent the top of one of said side walls through which the grid-containing liquid is entered into the tank, an overflow weir for maintaining the liquid within the tank at a desired level and an outlet for the liquid in communication therewith, said overflow weir and said outlet being remote from said inlet, means to introduce air upwardly into the body of the liquid from a region above the bottom of the tank and adjacent the said inlet wall thereof and thereby to circulate the liquid in the direction of said overflow weir, said air introducing means comprising a plurality of spaced air diffusing elements, a trough in the tank bottom beneath the said air diffusing elements into which heavy solids which precipitate from the body of the liquid are carried by the circulating liquid, and means to remove the solids from the trough to the exterior of the tank.

PHILIP F. MORGAN.
CHARLES E. LAWRENZ.

(References on following page)

REFERENCES CITED

The following references are of record in the file of this patent:

UNITED STATES PATENTS

| Number | Name | Date |
|---|---|---|
| 1,404,873 | McGee | Jan. 31, 1922 |
| 1,716,228 | Horne | June 4, 1929 |
| 1,855,982 | Mohr | Apr. 26, 1932 |
| 1,900,809 | Hammerly | Mar. 7, 1933 |
| 2,126,228 | Streander | Aug. 9, 1938 |
| 2,144,385 | Nordell | Jan. 17, 1939 |
| 2,272,441 | Streander | Feb. 10, 1942 |
| 2,322,017 | Hartman | June 15, 1943 |
| 2,328,655 | Lannert | Sept. 7, 1943 |
| 2,342,024 | Walker | Feb. 15, 1944 |
| 2,353,602 | Trotter | July 11, 1944 |
| 2,369,194 | Weber | Feb. 13, 1945 |
| 2,370,974 | Langdon | Mar. 6, 1945 |
| 2,381,579 | Durdin, 3d | Aug. 7, 1945 |
| 2,479,403 | Powers | Aug. 16, 1949 |

FOREIGN PATENTS

| Number | Country | Date |
|---|---|---|
| 15,783 | Great Britain | of 1895 |

Certificate of Correction

Patent No. 2,532,457 December 5, 1950

PHILIP F. MORGAN ET AL.

It is hereby certified that error appears in the printed specification of the above numbered patent requiring correction as follows:

Column 5, line 58, for the word "lever" read *level*; column 7, line 60, after "through" insert *which*; column 10, line 56, for "grid" read *grit*;

and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*